(12) United States Patent
Yang

(10) Patent No.: US 12,016,076 B2
(45) Date of Patent: Jun. 18, 2024

(54) INFORMATION PROCESSING METHOD AND APPARATUS, AND COMPUTER STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 345 days.

(21) Appl. No.: 17/596,378

(22) PCT Filed: Jun. 21, 2019

(86) PCT No.: PCT/CN2019/092420
§ 371 (c)(1),
(2) Date: Dec. 8, 2021

(87) PCT Pub. No.: WO2020/252796
PCT Pub. Date: Dec. 24, 2020

(65) Prior Publication Data
US 2022/0232669 A1 Jul. 21, 2022

(51) Int. Cl.
*H04W 76/28* (2018.01)
*H04W 76/14* (2018.01)
*H04W 76/27* (2018.01)
*H04W 76/30* (2018.01)
*H04W 76/38* (2018.01)
*H04W 92/18* (2009.01)

(52) U.S. Cl.
CPC ............ *H04W 76/38* (2018.02); *H04W 92/18* (2013.01)

(58) Field of Classification Search
CPC ..... H04W 76/38; H04W 92/18; H04W 76/14; H04W 76/28; H04W 76/27; H04W 76/30
USPC .......................................................... 370/310
See application file for complete search history.

(56) References Cited

U.S. PATENT DOCUMENTS

| 9,713,197 | B2 | 7/2017 | Kim et al. |
| 2009/0042560 | A1 | 2/2009 | Islam |
| 2015/0312775 | A1* | 10/2015 | Yi .................... H04W 72/0446 370/254 |
| 2015/0312960 | A1* | 10/2015 | Kim .................... H04W 72/04 370/329 |

FOREIGN PATENT DOCUMENTS

| CN | 103139931 A | 6/2013 |
| CN | 105338628 A | 2/2016 |
| CN | 109246802 A | 1/2019 |
| CN | 110622617 A | 12/2019 |

OTHER PUBLICATIONS

International Search Report in the international application No. PCT/CN2019/092420, mailed on Mar. 6, 2020.
English translation of the Written Opinion of the International Search Authority in the international application No. PCT/CN2019/092420, mailed on Mar. 6, 2020.

* cited by examiner

*Primary Examiner* — Inder P Mehra
(74) *Attorney, Agent, or Firm* — Syncoda LLC; Feng Ma

(57) ABSTRACT

An information processing method includes: determining the state of an inactive timer; determining the state of a sidelink inactive timer; and determining, according to the state of the inactive timer and the state of the sidelink inactive timer, whether to release an RRC connection.

16 Claims, 7 Drawing Sheets

INFORMATION PROCESSING METHOD AND APPARATUS, AND COMPUTER STORAGE MEDIUM

CROSS-REFERENCE TO RELATED APPLICATIONS

This application is a U.S. national stage of International Application No. PCT/CN2019/092420 filed on Jun. 21, 2019, the disclosure of which is hereby incorporated by reference in its entirety.

BACKGROUND

At present, there are two methods for releasing a Radio Resource Control (RRC) connection. One is that a network sends an RRC connection release message, and User Equipment (UE) can release the RRC connection after receiving this message; and the other is that an inactive timer configured by a base station for the UE is overtime and the UE automatically releases the RRC connection. The second method is introduced to solve the problem that the UE may not correctly receive the RRC connection release message.

A Sidelink technology is a near-field communication technology in which UE directly connects information through wireless interfaces therebetween. Sometimes, a Sidelink is also called a side link or a direct link. If a piece of UE enters a connected state in order to acquire Sidelink resources, a Dedicated Traffic Channel (DTCH), a Dedicated Control Channel (DCCH), and a Common Control Channel (CCCH) may have no transmission and reception of a Service Data Unit (SDU), but the transmission and reception of the Sidelink data are in progress, the inactive timer will time out/expire, and the RRC connection of the UE will be released.

SUMMARY

The disclosure provides an information processing method and apparatus, and a computer storage medium.

According to a first aspect of embodiments of the disclosure, an information processing method is provided, which may include: determining a state of an inactive timer; determining a state of a Sidelink inactive timer; and determining whether to release a Radio Resource Control (RRC) connection according to the state of the inactive timer and the state of the Sidelink inactive timer.

In the above-mentioned solution, in some embodiments, before determining the state of the Sidelink inactive timer, the method may further include: the Sidelink inactive timer configured for UE by a base station is received.

In the above-mentioned solution, in some embodiments, before receiving the Sidelink inactive timer configured for the UE by the base station, the method may further include: a Sidelink UE information message is sent to the base station.

In the above-mentioned solution, in some embodiments, the method may further include: the Sidelink inactive timer is started or restarted in response to determining that UE has SDU transceiving on any logical channel related to a Sidelink.

In the above-mentioned solution, in some embodiments, the method may further include: a Sidelink logical channel indication list configured for UE by a base station is received; and the Sidelink inactive timer is started or restarted in response to determining that the UE has SDU transceiving on a channel corresponding to a Sidelink logical channel indication in the Sidelink logical channel indication list.

In the above-mentioned solution, in some embodiments, the method may further include: a Prose Quality of Service (QoS) Indication (PQI) list configured for UE by a base station is received; and the Sidelink inactive timer is started or restarted in response to determining that the UE has data transceiving corresponding to a PQI in the PQI list.

In the above-mentioned solution, in some embodiments, the operation that whether to release the RRC connection is determined according to the state of the inactive timer and the state of the Sidelink inactive timer may include: the RRC connection is determined to be released responsive to that both the Sidelink inactive timer and the inactive timer expire; or the RRC connection is determined to be released in response to determining that the Sidelink inactive timer expires and the inactive timer is not configured for UE; or the RRC connection is determined to be released in response to determining that the Sidelink inactive timer is not configured for the UE and the inactive timer expires.

In the above-mentioned solution, in some embodiments, the operation that whether to release the RRC connection is determined according to the state of the inactive timer and the state of the Sidelink inactive timer may include: the RRC connection is determined not to be released and an RRC connected state is remained responsive to that one of the inactive timer and the Sidelink inactive timer expires and another one of the inactive timer and the Sidelink inactive timer is still running.

According to a second aspect of embodiments of the disclosure, an information processing method is provided, which may include: configuring a Sidelink inactive timer for User Equipment (UE), so that the UE determines whether to release a Radio Resource Control (RRC) connection according to a state of an inactive timer and a state of the Sidelink inactive timer.

In the above-mentioned solution, in some embodiments, the method may further include: a Sidelink logical channel indication list is configured for the UE, so that the Sidelink inactive timer is started or restarted in response to determining that the UE has SDU transceiving on a channel corresponding to a Sidelink logical channel indication in the Sidelink logical channel indication list.

In the above-mentioned solution, in some embodiments, the method may further include: a PQI list is configured for the UE, so that the Sidelink inactive timer is started or restarted in response to determining that the UE has data transceiving corresponding to a PQI in the PQI list.

According to a third aspect of embodiments of the disclosure, an information processing apparatus is provided, including a determination unit and a control unit. The determination unit may be configured to determine a state of an inactive timer and a state of a Sidelink inactive timer. The control unit may be configured to determine whether to release an RRC connection according to the state of the inactive timer and the state of the Sidelink inactive timer.

In the above-mentioned solution, in some embodiments, the apparatus may further include a transceiving unit. The transceiving unit may be configured to receive the Sidelink inactive timer configured for UE by a base station before the determination unit determines the state of the Sidelink inactive timer.

In the above-mentioned solution, in some embodiments, the transceiving unit may further be configured to send a Sidelink UE information message to the base station before the determination unit receives the Sidelink inactive timer configured for the UE by the base station.

In the above-mentioned solution, in some embodiments, the determination unit may further be configured to determine whether UE has SDU transceiving on any logical channel related to a Sidelink. The control unit may further be configured to start or restart the Sidelink inactive timer in response to determining that the UE has the SDU transceiving on any logical channel related to the Sidelink.

In the above-mentioned solution, in some embodiments, the transceiving unit may further be configured to receive a Sidelink logical channel indication list configured for UE by a base station; the determination unit may further be configured to determine whether the UE receives the Sidelink logical channel indication list; and the control unit may be configured to start or restart the Sidelink inactive timer responsive to that the determination unit determines that the Sidelink logical channel indication list is received and determines that the UE has SDU transceiving on a channel corresponding to a Sidelink logical channel indication in the Sidelink logical channel indication list.

In the above-mentioned solution, in some embodiments, the transceiving unit may further be configured to receive a PQI list configured for UE by a base station; the determination unit may further be configured to determine whether the UE receives the PQI list; and the control unit may further be configured to start or restart the Sidelink inactive timer responsive to that the determination unit determines that the PQI list is received and determines that the UE has data transceiving corresponding to a PQI in the PQI list.

In the above-mentioned solution, in some embodiments, the control unit may further be configured to: determine to release the RRC connection responsive to that both the Sidelink inactive timer and the inactive timer expire; or determine to release the RRC connection in response to determining that the Sidelink inactive timer expires and the inactive timer is not configured for UE; or determine to release the RRC connection in response to determining that the Sidelink inactive timer is not configured for the UE and the inactive timer expires.

In the above-mentioned solution, in some embodiments, the control unit may further be configured to determine not to release the RRC connection and remain an RRC connected state responsive to that one of the inactive timer and the Sidelink inactive timer expires and another one of the inactive timer and the Sidelink inactive timer is still running.

According to a fourth aspect of embodiments of the disclosure, an information processing apparatus is provided, including a processing unit. The processing unit may be configured to configure a Sidelink inactive timer for UE, so that the UE determines whether to release an RRC connection according to a state of an inactive timer and a state of the Sidelink inactive timer.

In the above-mentioned solution, in some embodiments, the processing unit may further be configured to configure a Sidelink logical channel indication list for the UE, so that the Sidelink inactive timer is started or restarted in response to determining that the UE has SDU transceiving on a channel corresponding to a Sidelink logical channel indication in the Sidelink logical channel indication list.

In the above-mentioned solution, in some embodiments, the processing unit may further be configured to configure a PQI list for the UE, so that the Sidelink inactive timer is started or restarted in response to determining that the UE has data transceiving corresponding to a PQI in the PQI list.

According to a fifth aspect of embodiments of the disclosure, an information processing apparatus is provided, including: a processor; and a memory configured to store instructions executable by the processor. The processor may be configured to perform any one of the foregoing information processing methods applied to a technical solution on a UE side by executing the executable instructions.

According to a sixth aspect of embodiments of the disclosure, an information processing apparatus is provided, including: a processor; and a memory configured to store instructions executable by the processor. The processor may be configured to perform any one of the foregoing information processing methods applied to a technical solution on a base station side by executing the executable instructions.

According to a seventh aspect of embodiments of the disclosure, a non-transitory computer storage medium is provided. The non-transitory computer storage medium stores executable instructions. Any one of the foregoing information processing methods applied to a technical solution on a UE side may be implemented after the executable instructions are executed by a processor.

According to an eighth aspect of embodiments of the disclosure, a non-transitory computer storage medium is provided. The non-transitory computer storage medium stores executable instructions. Any one of the foregoing information processing methods applied to a technical solution on a base station side may be implemented after the executable instructions are executed by a processor.

The technical solutions provided in the embodiments of the disclosure may include the following beneficial benefits.

A state of an inactive timer configured for UE by a base station and a state of a Sidelink inactive timer configured for the UE by the base station are determined; and whether to release an RRC connection is determined according to the state of the inactive timer and the state of the Sidelink inactive timer. Thus, an RRC connection releasing method is give, which can avoid the problem of repeated establishment and release of the RRC connection due to a request for Sidelink resources.

It is to be understood that the above general description and the following detailed description are only intended to be illustrative and not restrictive, but cannot limit the disclosure.

BRIEF DESCRIPTION OF THE DRAWINGS

The accompanying drawings herein are incorporated in the specification as a part of the specification, showing embodiments that are in accordance with the disclosure, and used together with the specification to explain a principle of the disclosure.

DETAILED DESCRIPTION

Example embodiments are described in detail herein, and examples of the example embodiments are presented in the accompanying drawings. When the following description relates to the accompanying drawings, unless specified otherwise, same numbers in different accompanying drawings represent a same or similar element. Implementation modes described in the following embodiments do not represent all implementation modes consistent with the embodiments of the disclosure. On the contrary, they are only examples of apparatuses and methods that are described in the appended claims in detail and that are consistent with some aspects of the embodiments of the disclosure.

The terms used the embodiments of the embodiment are merely for the purpose of illustrating specific embodiments, and are not intended to limit the embodiments of the disclosure. The terms "a", "the" and "this" of singular forms used in the embodiments and the appended claims of the disclosure are also intended to include plural forms, unless otherwise specified in the context clearly. It is also to be understood that the term "and/or" used herein includes any and all combinations of one or more of the associated listed items.

It is to be understood that, although the terms first, second, third, etc. may be used for describing various information in the embodiments of the disclosure, such information should not be limited to these terms. These terms are only used to distinguish the same type of information from one another. For example, without departing from the scope of the embodiments of the disclosure, first information may also be referred to as second information, and similarly, the second information may also be referred to as the first information. Depending on the context, the words "in case of" and "if" as used herein can be interpreted as "when" or "at the time that" or "in response to determine".

Figure 1:
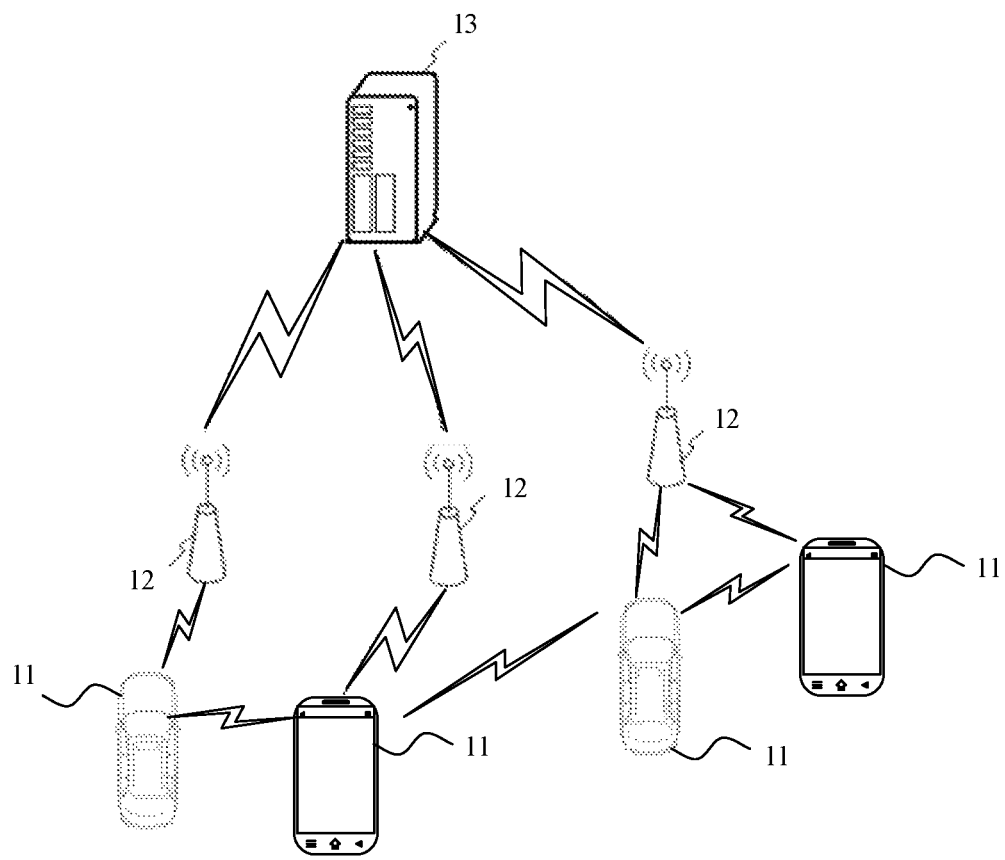
FIG. 1 is a structural schematic diagram of a wireless communications system, according to an embodiment.

Referring to FIG. 1, FIG. 1 is a structural schematic diagram of a wireless communication system provided by embodiments of the disclosure. As shown in FIG. 1, a wireless communication system is a communication system based on a cellular mobile communication technology. The wireless communication system may include: a plurality of terminals 11 and a plurality of base stations 12.

The terminal 11 may be a device providing voice and/or data connectivity for a user. The terminal 11 may communicate with one or more core networks through a Radio Access Network (RAN). The terminal 11 may be Internet of Things terminals, for example, a sensor device, a mobile phone (or called a "cell" phone), or a computer with an Internet of Things terminal, and for example, may be a fixed, portable, pocket-sized, hand-held, computer built-in or vehicle-mounted mobile apparatus, for example, a Station (STA), a subscriber unit, a subscriber station, a mobile station, a mobile, a remote station, an access point, a remote terminal, an access terminal, a user terminal, a user agent, a user device, or User Equipment (UE). Or, the terminal 11 may also be an Unmanned Aerial Vehicle (UAV). Or, the terminal 11 may also be a vehicle-mounted device, and for example, it may be a driving computer with a wireless communication function or a wireless communication device that is externally connected to a driving computer. Or, the terminal 11 may also be a roadside device, for example, it may be a street lamp, a signal lamp, or other roadside devices with a wireless communication function.

The base station 12 may be a network side device in a wireless communication system. The wireless communication system may be a 4th Generation mobile communication (4G) system, also called a Long Term Evolution (LTE) system. Or, the wireless communication system may also be a 5th-Generation (5G) system, also called a New Radio (NR) system or a 5G NR system. Or, the wireless communication system may also be a next-generation system of the 5G system. An access network in the 5G system may be called a New Generation-Radio Access Network (NG-RAN). Or, the wireless communication system may also be a Machine-Type Communication (MTC) system.

The base station 12 may be an Evolved Node B (eNB) in the 4G system. Or, the base station 12 may also be a gNB adopting a central distributed architecture in the 5G system. The base station 12, when adopting the central distributed architecture, usually includes a Central Unit (CU) and at least two Distributed Units (DUs). Protocol stacks of a Packet Data Convergence Protocol (PDCP) layer, a Radio Link Control (RLC) layer and a Media Access Control (MAC) layer are arranged in the CU. A protocol stack of a Physical (PHY) layer is arranged in the DU. A specific implementation mode of the base station 12 is not limited in the embodiments of the disclosure.

The base station 12 may establish a wireless connection with the terminal 11 through a radio interface. In different implementation modes, the radio interface is a 4G-standard-based radio interface; or, the radio interface is a 5G-standard-based radio interface, for example, the radio interface is an NR interface; or, the radio interface may also be a radio interface based on a next-generation mobile communication network technology standard of 5G.

In some embodiments, an End to End (E2E) connection may also be established between the terminals 11. For example, scenarios such as Vehicle to Vehicle (V2V) communication, Vehicle to Infrastructure (V2I) communication, and Vehicle to Pedestrian (V2P) communication in Vehicle to Everything (V2X) communication.

In some embodiments, the above-mentioned wireless communication system may also include a network management device 13.

A plurality of base stations 12 are connected to the network management device 13 respectively. The network management device 13 may be a core network device in the wireless communication system. For example, the network management device 13 may be an Mobility Management Entity (MME) in an Evolved Packet Core (EPC) network. Or, the network management device may also be other core network devices, for example, a Serving Gate Way (SGW), a Public Data Network Gate Way (PGW), a Policy and Charging Rules Function (PCRF) or a Home Subscriber Server (HSS). An implementation form of the network management device 13 is not limited in the embodiments of the disclosure.

In the standard, the inactive timer configured for the UE by the base station will be triggered to restart by the following events.
  1. An MAC entity receives an MAC SDU of a Dedicated Traffic Channel (DTCH), a Dedicated Control Channel (DCCH), and a Common Control Channel (CCCH); or
  2. The MAC entity sends the MAC SDU of the DTCH and the DCCH.

When the inactive timer configured for the UE by the base station expires, the UE will automatically release the RRC connection. That is to say, if there is no data or control signaling sent for a period of time, the UE will automatically release the RRC connection.

Figure 2:
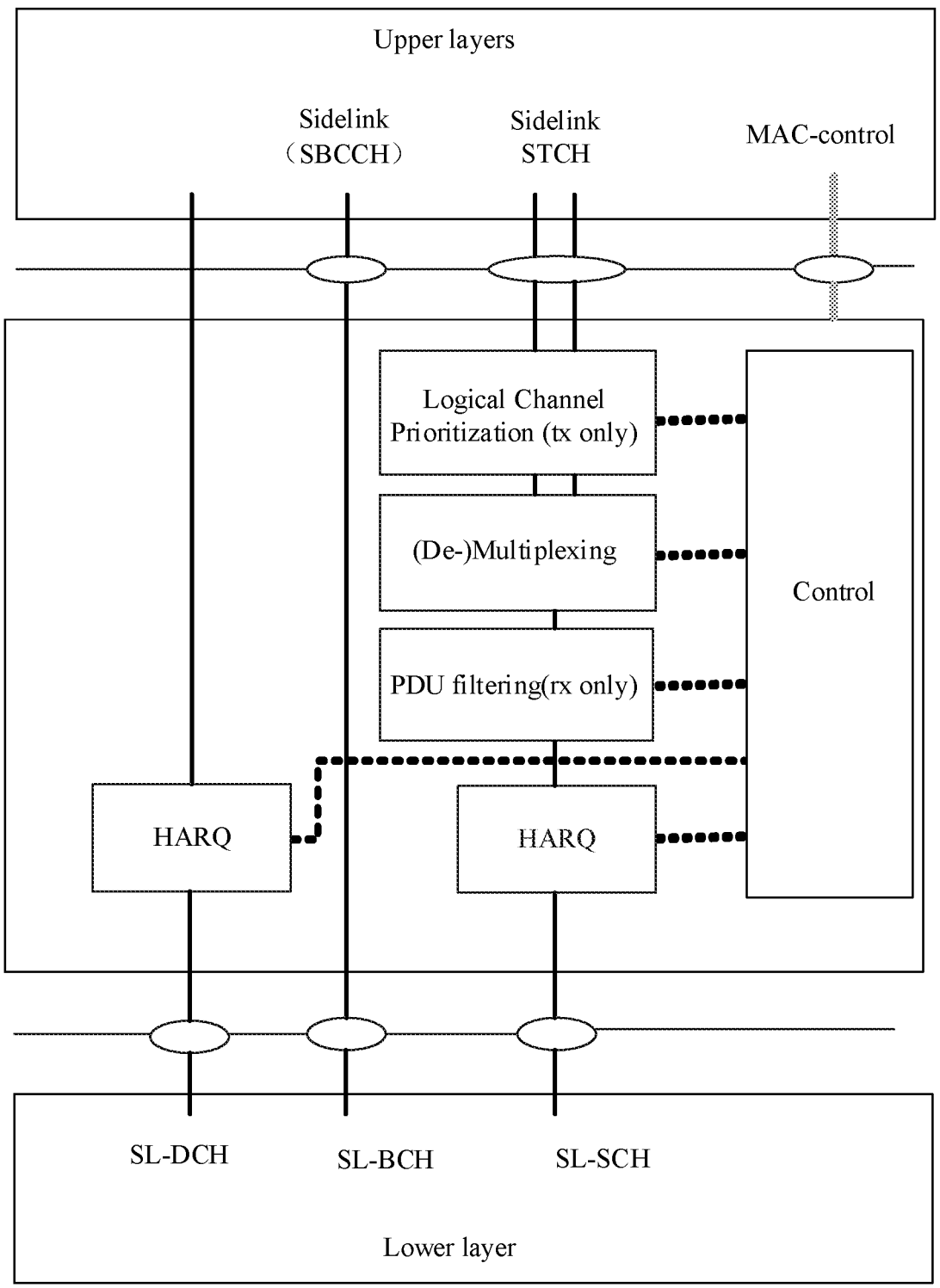
FIG. 2 is a schematic diagram about Sidelink data transmission, according to an embodiment.

In order to support direct communication between UE, a new link Sidelink is introduced, as shown in FIG. 2. A transmission channel related to the Sidelink includes: a Sidelink Broadcast Channel (SL-BCH), a Sidelink Discovery Channel (SL-DCH), and a Sidelink Shared Channel (SL-SCH). Sidelink related logical channels include: a Sidelink Broadcast Control Channel (SBCCH), and a Sidelink Traffic Channel (STCH).

The Sidelink has two resource allocation modes. One is allocated through system broadcast, and the other is allocated through dedicated signaling. If a piece of UE is in an idle state, the Sidelink resources of the system broadcast should be read first. If the system broadcast cannot meet a requirement, then the UE enters a connected state to requests dedicated resources from the base station. The UE sends a Sidelink UE information message, which includes a destination UE indication list and other assistance messages to help the base station to allocate appropriate Sidelink resources, to the base station. If the RRC connection of the UE is released, then the Sidelink resources allocated through the dedicated signaling will also be released. In 5G, a new QoS index, i.e., a PQI, including data rate, transmission delay, etc., is introduced for a Sidelink service.

If a piece of UE enters the connected state in order to acquire the Sidelink resources, in a scenario, there is no SDU transmission and reception of the DTCH, DCCH, and the CCCH, and when the inactive timer expires, the RRC connection of the UE will be released, but the data transceiving of the Sidelink is in progress. At this time, the UE will enter the connected state again because of the need for the data transceiving of the Sidelink, thus the UE will continuously repeat the release and connection establishment processes.

Based on the above-mentioned wireless communication system, various embodiments of the method of the disclosure are provided to avoid repeated establishment and release of the RRC connection caused by requesting the Sidelink resources.

Figure 3:
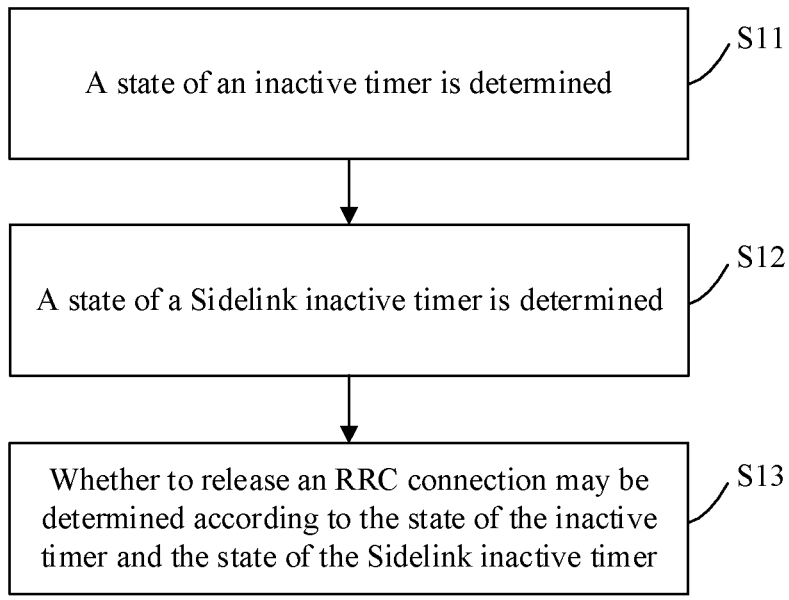
FIG. 3 is a first flowchart of an information processing method, according to an embodiment.

FIG. 3 is a first flowchart of an information processing method according to an embodiment. As shown in FIG. 3, the information processing method is applied to UE, and includes the following steps.

At S11, a state of an inactive timer is determined.

The state of the inactive timer at least includes: whether the inactive timer is configured; or if the inactive timer is configured, whether the inactive timer expires is determined.

In some optional implementation modes, the inactive timer configured for the UE by the base station will be triggered to restart by the following events:
1. The MAC entity receives the MAC SDU of the DTCH, DCCH and the CCCH, or
2. the MAC entity sends the MAC SDU of the DTCH and the DCCH.

At S12, a state of a Sidelink inactive timer is determined.

The state of the Sidelink inactive timer at least includes: whether the Sidelink inactive timer is configured; or if the Sidelink inactive timer is configured, whether the Sidelink inactive timer expires is determined.

In an optional implementation mode, before determining the state of the Sidelink inactive timer, the method further includes: the Sidelink inactive timer configured for the UE by the base station is received.

In an optional implementation mode, before receiving the Sidelink inactive timer configured for the UE by the base station, the method further includes: a Sidelink UE information message is sent to the base station.

The Sidelink UE information message includes a destination UE indication list and other assistance messages to help the base station to allocate appropriate Sidelink resources.

If the UE supports a Sidelink capability and the UE needs to perform Sidelink transmission, the UE needs to report the Sidelink capability of the UE through the Sidelink UE information message.

It is to be noted that the disclosure does not limit an execution sequence of S11 and S12. For example, S11 and S12 may be performed simultaneously, S11 may be performed before S12, or S12 may also be performed before S11.

At S13, whether to release an RRC connection may be determined according to the state of the inactive timer and the state of the Sidelink inactive timer.

In some optional implementation modes, the step whether to release the RRC connection is determined according to the state of the inactive timer and the state of the Sidelink inactive timer includes: the RRC connection is determined to be released when both the Sidelink inactive timer and the inactive timer expire; or the RRC connection is determined to be released when the Sidelink inactive timer expires and it is determined that the inactive timer is not configured for the UE; or the RRC connection is determined to be released when the Sidelink inactive timer is not configured for the UE and it is determined that the inactive timer expires.

In some optional implementation modes, the step whether to release the RRC connection is determined according to the state of the inactive timer and the state of the Sidelink inactive timer includes: the RRC connection is determined not to be released and the RRC connected state is remained when one of the inactive timer and the Sidelink inactive timer expires and the other one is still running.

In the above-mentioned solution, in some embodiments, the method further includes: the Sidelink inactive timer is started or restarted when it is determined that the UE has transmission and reception of an SDU (or called SDU transceiving) on any logical channel related to the Sidelink.

In an optional implementation mode, the Sidelink inactive timer is started or restarted when it is determined that a Sidelink logical channel indication list and a PQI list are not configured for the UE by the base station, but it is determined that the UE has SDU transceiving on any logical channel related to the Sidelink.

In the above-mentioned solution, in some embodiments, the method further includes: a Sidelink logical channel indication list configured for the UE by the base station is received; and the Sidelink inactive timer is started or restarted when it is determined that the UE has the transmission and reception of the SDU on a channel corresponding to a Sidelink logical channel indication in the Sidelink logical channel indication list.

In the above-mentioned solution, in some embodiments, the method further includes: a PQI list configured for the UE by the base station is received; and the Sidelink inactive timer is started or restarted when it is determined that the UE has data transceiving corresponding to a PQI in the PQI list.

In the embodiments of the disclosure, the time size/duration of the inactive timer configured for the UE by the base station is not defined, and the time size of the Sidelink inactive timer configured for the UE by the base station is not defined.

In practical applications, the timing time of the inactive timer and the timing time of the Sidelink inactive timer may be the same; or, the timing time of the Sidelink inactive timer may be longer than that of the inactive timer; or, the timing time of the Sidelink inactive timer may be shorter than that of the inactive timer.

According to the technical solution of the embodiments of the disclosure, whether to release the RRC connection is determined according to the state of the inactive timer and the state of the Sidelink inactive timer, so as to ensure that the RRC is in a connected state when the UE has a demand for Sidelink data transceiving, which can avoid continuously repeated RRC release and connection establishment processes.

Figure 4:
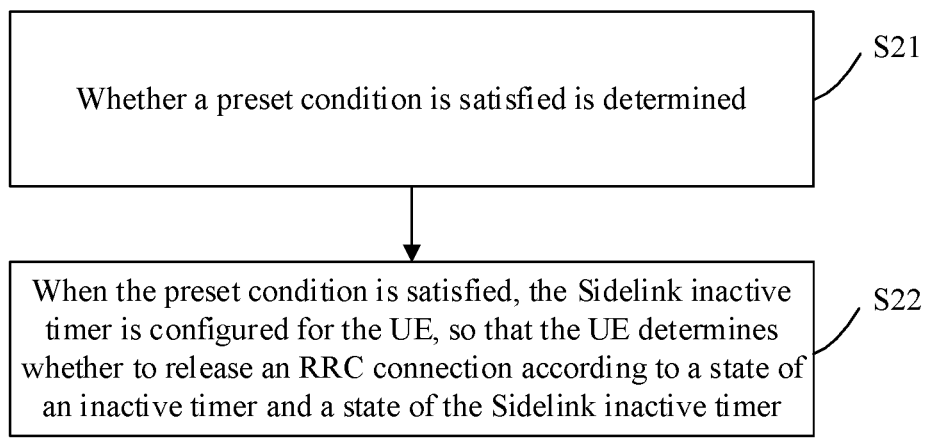
FIG. 4 is a second flowchart of an information processing method, according to an embodiment.

FIG. 4 is a second flowchart of an information processing method according to an embodiment. As shown in FIG. 4, the information processing method is applied to a base station, and includes the following steps.

At S21, whether a preset condition is satisfied is determined.

In some implementation modes, the preset condition includes: when UE requests for Sidelink resources in a connected state, the UE sends the Sidelink UE information message to a base station; and when the base station receives the Sidelink UE information message sent by the UE, the base station configures a Sidelink inactive timer for the UE.

At S22, when the preset condition is satisfied, the Sidelink inactive timer is configured for the UE, so that the UE determines whether to release an RRC connection according to a state of an inactive timer and a state of the Sidelink inactive timer.

In the above-mentioned solution, the method further includes: a Sidelink logical channel indication list is configured for the UE, so that the Sidelink inactive timer is started or restarted when the UE has SDU transceiving on a channel corresponding to a Sidelink logical channel indication in the Sidelink logical channel indication list.

In the above-mentioned solution, the method further includes: a PQI list is configured for the UE, so that the Sidelink inactive timer is started or restarted when the UE has data transceiving corresponding to a PQI in the PQI list.

According to the technical solution of the embodiments of the disclosure, the Sidelink active timer is configured for the UE by the base station, so that the UE can determine whether to release the RRC connection according to the state of the inactive timer and the state of the Sidelink inactive timer, so as to ensure that the RRC is in a connected state when the UE has a demand for Sidelink data transceiving, which can avoid continuously repeated processes of RRC release and connection establishment.

Figure 5:
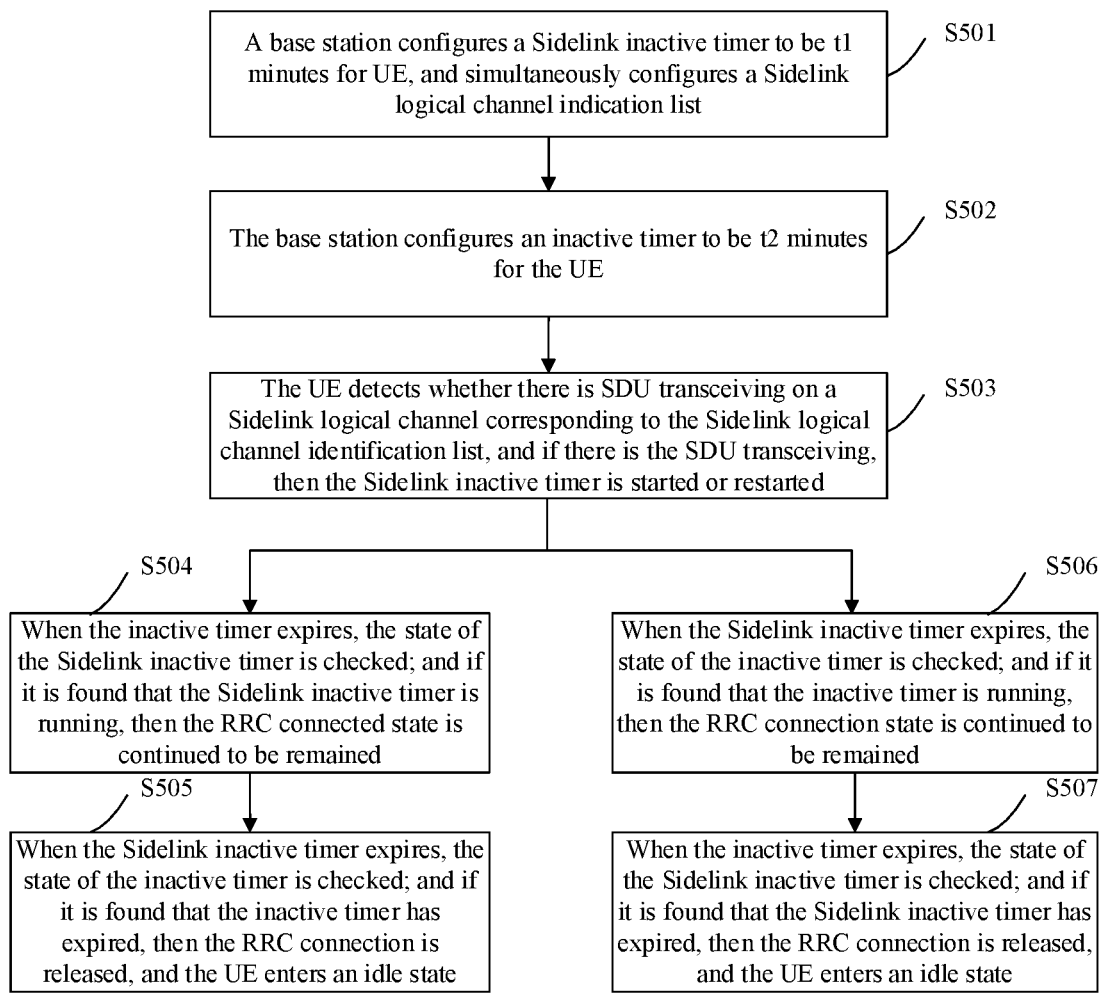
FIG. 5 is a flowchart of releasing an RRC connection, according to an embodiment.

FIG. 5 is a flowchart of releasing an RRC connection according to an embodiment, as shown in FIG. 5, which includes the steps as follows.

At 501, a base station configures a Sidelink inactive timer to be t1 minutes for UE, and simultaneously configures a Sidelink logical channel indication list.

The Sidelink logical channel indication list includes at least one Sidelink logical channel indication.

Taking the Sidelink logical channel indication including 1, 2, 3, 4, 5, 6, 7, 8, 9, 10, 11, 12, 13, 14, 15, and 16 as examples, the Sidelink logical channel indication list may include at least one of 1 to 16. For example, the Sidelink logical channel indication list includes 1 and 5.

At S502, the base station configures an inactive timer to be t2 minutes for the UE.

At 503, the UE detects whether there is SDU transceiving on a Sidelink logical channel corresponding to the Sidelink logical channel identification list, and if there is the SDU transceiving, then the Sidelink inactive timer is started or restarted.

For example, the Sidelink logical channel indication list includes 1 and 5. If the UE detects that there is SDU transceiving on the Sidelink logical channel 1 and/or 5, then the Sidelink inactive timer is started or restarted.

Here, starting the Sidelink inactive timer refers to starting the Sidelink inactive timer for the first time.

Here, restarting the Sidelink inactive timer refers to resetting the time of the Sidelink inactive timer to start to retime from 0 when the Sidelink inactive timer is in a working state.

In the following, t1 being greater than t2 is taken as an example.

At S504, when the inactive timer expires, the state of the Sidelink inactive timer is checked. If it is found that the Sidelink inactive timer is running, then the RRC connected state is continued to be remained.

At S505, when the Sidelink inactive timer expires, the state of the inactive timer is checked. If it is found that the inactive timer has expired, then the RRC connection is released, and the UE enters an idle state.

In the following, t1 being less than t2 is taken as an example.

At S506, when the Sidelink inactive timer expires, the state of the inactive timer is checked. If it is found that the inactive timer is running, then the RRC connection state is continued to be remained.

At S507, when the inactive timer expires, the state of the Sidelink inactive timer is checked. If it is found that the Sidelink inactive timer has expired, then the RRC connection is released, and the UE enters an idle state.

It is to be understood that the example shown in FIG. 5 is an optional specific implementation mode, but is not limited thereto.

It is also to be understood that the example of FIG. 5 is only to illustrate an embodiment of the present application, and a person skilled in the art would have been able to make various obvious changes and/or substitutions on the basis of the example of FIG. 5, and the resulting technical solution still falls within the disclosed scope of the embodiment of the present application.

Figure 6:
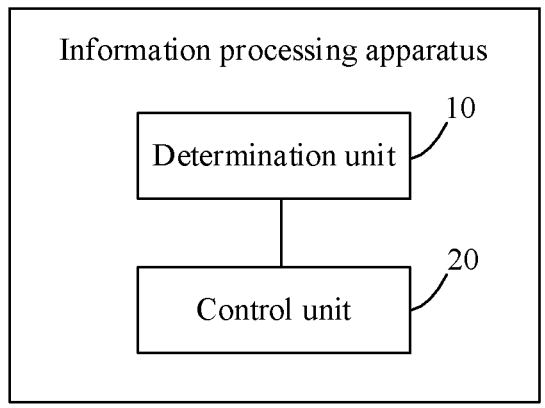
FIG. 6 is a first block diagram of an information processing apparatus, according to an embodiment.

FIG. 6 is a first block diagram of an information processing apparatus according to an embodiment. The information processing apparatus is applied to a UE side. Referring to FIG. 6, the apparatus includes a determination unit 10 and a control unit 20.

The determination unit 10 is configured to determine a state of an inactive timer and a state of a Sidelink inactive timer.

The control unit 20 is configured to determine whether to release an RRC connection according to the state of the inactive timer and the state of the Sidelink inactive timer.

In some optional implementation modes, the apparatus further includes a transceiving unit 30.

The transceiving unit 30 (not shown in FIG. 6) is configured to receive a Sidelink inactive timer configured for UE by a base station before the determination unit 10 determines the state of the Sidelink inactive timer.

In some optional implementation modes, the transceiving unit 30 is further configured to send a Sidelink UE information message to the base station before receiving the Sidelink inactive timer configured for the UE by the base station.

In some optional implementation modes, the determination unit 10 is further configured to determine whether the UE has SDU transceiving on any logical channel related to the Sidelink; and the control unit 20 is further configured to start or restart the Sidelink inactive timer when the determination unit 10 determines that the UE has the SDU transceiving on any logical channel related to the Sidelink.

In some optional implementation modes, the transceiving unit 30 is further configured to receive a Sidelink logical channel indication list configured for the UE by the base station; the determination unit 10 is further configured to determine whether the transceiving unit 30 receives a PQI list; and the control unit 20 is further configured to start or restart the Sidelink inactive timer when the determination unit 10 determines that the PQI list is received and determines that the UE has the SDU transceiving on a channel corresponding to a Sidelink logical channel indication in the Sidelink logical channel indication list.

In some optional implementation modes, the transceiving unit 30 is further configured to receive a PQI list configured for the UE by the base station; the determination unit 10 is further configured to determine whether the PQI list is received; and the control unit 20 is further configured to start or restart the Sidelink inactive timer when the determination unit 10 determines that the PQI list is received and determines that the UE has data transceiving corresponding to a PQI in the PQI list.

In some optional implementation modes, the control unit 20 is further configured to: determine to release the RRC connection when both the Sidelink inactive timer and the inactive timer expire; or determine to release the RRC connection when the Sidelink inactive timer expires and it is determined that the inactive timer is not configured for the UE; or determine to release the RRC connection when the Sidelink inactive timer is not configured for UE and it is determined that the inactive timer expires.

In some optional implementation modes, the control unit 20 is further configured to: determine not to release the RRC connection and remain an RRC connected state when one of the inactive timer and the Sidelink inactive timer expires and the other one of the inactive timer and the Sidelink inactive timer is still running.

For the apparatus in the above-mentioned embodiment, specific modes of performing operations by each module are described in detail in the embodiments related to the method, and no details are described in detail herein.

In actual application, all specific structures of the above-mentioned determination unit 10, control unit 20, and transceiving unit 30 may be implemented by the information processing apparatus or a Central Processing Unit (CPU), a Micro Controller Unit (MCU), a Digital Signal Processing (DSP), a Programmable Logic Controller (PLC), or the like in a terminal to which the information processing apparatus belongs.

The information processing apparatus of the present embodiment may be arranged on a UE side.

It is to be understood by those skilled in the art that the functions of various processing modules in the information processing apparatus of the embodiments of the disclosure may be understood with reference to the foregoing description of the information processing method applied to the UE side. Various processing modules in the information processing apparatus of the embodiments of the disclosure may be implemented by analog circuits implementing the functions described in the embodiments of the disclosure, or may also be implemented by running software that performs the functions described in the embodiments of the disclosure on a terminal.

According to the information processing apparatus of the embodiments of the disclosure, whether to release the RRC connection is determined according to the state of the inactive timer and the state of the Sidelink inactive timer, so as to ensure that the RRC is in a connected state when the UE has a demand for Sidelink data transceiving, which can avoid continuously repeated processes of RRC release and connection establishment.

Figure 7:
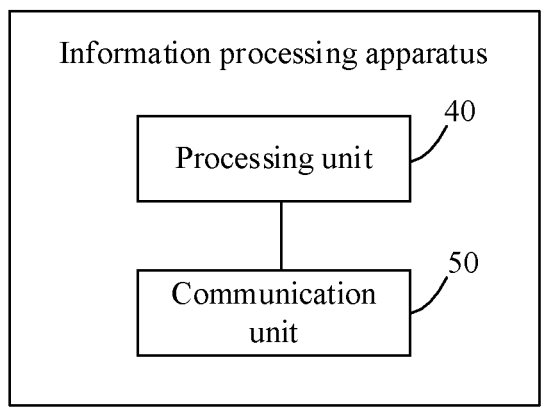
FIG. 7 is a second block diagram of an information processing apparatus, according to an embodiment.

FIG. 7 is a second block diagram of an information processing apparatus according to an embodiment. The information processing apparatus is applied to a base station side. Referring to FIG. 7, the apparatus includes a processing unit 40 and a communication unit 50.

The processing unit 40 is configured to configure a Sidelink inactive timer for UE, so that the UE determines whether to release an RRC connection according to a state of an inactive timer and a state of the Sidelink inactive timer.

The communication unit 50 is configured to send the Sidelink inactive timer to the UE.

In some optional implementation modes, the processing unit 40 is further configured to configure a Sidelink inactive timer for the UE when a preset condition is satisfied.

The preset condition includes: when UE requests for Sidelink resources in a connected state, the UE sends the Sidelink UE information message to a base station; and when the base station receives the Sidelink UE information message sent by the UE, the base station configures a Sidelink inactive timer for the UE.

In some optional implementation modes, the processing unit 40 is further configured to: configure a Sidelink logical channel indication list for the UE, so that the Sidelink inactive timer is started or restarted when the UE has SDU transceiving on a channel corresponding to a Sidelink logical channel indication in the Sidelink logical channel indication list; and the communication unit 50 is further configured to send the Sidelink logical channel indication list to the UE.

In some optional implementation modes, the processing unit 40 is further configured to: configure a PQI list for the UE, so that the Sidelink inactive timer is started or restarted when the UE has data transceiving corresponding to a PQI in the PQI list; and the communication unit 50 is further configured to send the PQI list to the UE.

With regard to the apparatus in the above-mentioned embodiments, specific modes of performing operations by each module are described in detail in the embodiments related to the method, which is not described in detail herein.

In actual applications, specific structures of the above-mentioned processing unit 40 and the communication unit 50 may both be implemented by the information processing apparatus or the CPU, the MCU, the DSP, the PLC, or the like in a base station to which the information processing apparatus belongs.

The information processing apparatus of the present embodiment may be arranged on a base station side.

It is to be understood by those skilled in the art that the functions of various processing modules in the information processing apparatus of the embodiments of the disclosure may be understood with reference to the foregoing description of the information processing method applied to the base station side. Various processing modules in the information processing apparatus of the embodiments of the disclosure may be implemented by analog circuits implementing the functions described in the embodiments of the disclosure, or may also be implemented by running software that performs the functions described in the embodiments of the disclosure on a terminal.

According to the information processing apparatus of the embodiments of the disclosure, the Sidelink active timer is configured for the UE, so that the UE can determine whether to release the RRC connection according to the state of the inactive timer and the state of the Sidelink inactive timer, so as to ensure that the RRC is in a connected state when the UE has a demand for Sidelink data transceiving, which can avoid continuously repeated processes of RRC release and connection establishment.

Figure 8:
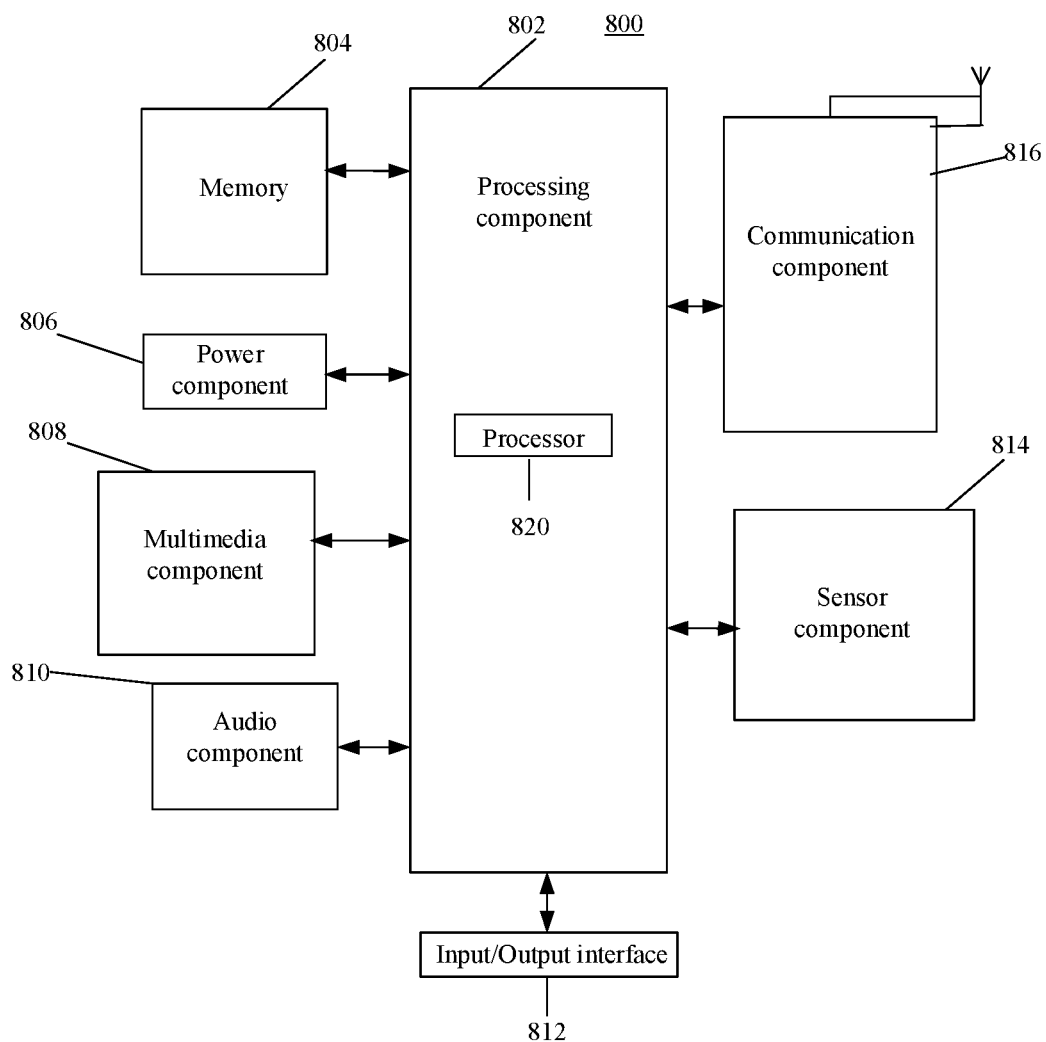
FIG. 8 is a first block diagram of an apparatus for information processing, according to an embodiment.

FIG. 8 is a block diagram of an apparatus 800 for information processing according to an embodiment. For example, the apparatus 800 may be a mobile phone, a computer, a digital broadcast terminal, a messaging device, a gaming console, a tablet, a medical device, exercise equipment, a personal digital assistant, or the like.

Referring to FIG. 8, the apparatus 800 may include one or more of the following components: a processing component 802, a memory 804, a power component 806, a multimedia component 808, an audio component 810, an Input/Output (I/O) interface 812, a sensor component 814, or a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above-mentioned method. Moreover, the processing component 802 may include one or more modules which facilitate interaction between the processing component 802 and other components. For example, the processing component 802 may include a multimedia module to facilitate interaction between the multimedia component 808 and the processing component 802.

The memory 804 is configured to store various types of data to support the operation of the device 800. Examples of such data include instructions for any Apps or methods operated on the apparatus 800, contact data, phonebook data, messages, pictures, video, etc. The memory 804 may be implemented by any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, and a magnetic or optical disk.

The power component 806 provides power for various components of the apparatus 800. The power component 806 may include a power management system, one or more power supplies, and other components associated with generation, management and distribution of power for the apparatus 800.

The multimedia component 808 includes a screen providing an output interface between the apparatus 800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the apparatus 800 is in an operation mode, such as a call mode, a recording mode and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button and a locking button.

The sensor component 814 includes one or more sensors configured to provide status assessments in various aspects for the apparatus 800. For example, the sensor component 814 may detect an on/off status of the apparatus 800 and relative positioning of components, such as a display and small keyboard of the apparatus 800, and the sensor component 814 may also detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a Complementary Metal Oxide Semiconductor (CMOS) or a Charge-Coupled Device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between the apparatus 800 and other devices. The apparatus 800 may access a communication-standard-based wireless network, such as a Wireless Fidelity (Wi-Fi) network, a 2nd-Generation (2G), 3rd-Generation (3G), $4^{th}$-Generation (4G), or $5^{th}$-Generation (5G) network or a combination thereof. In an embodiment, the communication component 816 receives a broadcast signal or broadcast associated information from an external broadcast management system through a broadcast channel. In an embodiment, the communication component 816 further includes a Near Field Communication (NFC) module to facilitate short-range communications. For example, the NFC module may be implemented on the basis of a Radio Frequency Identification (RFID) technology, an Infrared Data Association (IrDA) technology, an Ultra-Wide Band (UWB) technology, a BlueTooth (BT) technology, and other technologies.

In an embodiment, the apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned information processing method applied to the UE side.

In an embodiment, there is also provided a non-transitory computer storage medium including executable instructions, such as included in the memory 804, executable by the processor 820 of the apparatus 800 for performing the above-mentioned method. For example, the non-transitory computer storage medium may be a ROM, a Random Access Memory (RAM), a Compact Disc Read-Only Memory (CD-ROM), a magnetic tape, a floppy disc, an optical data storage device, and the like.

A computer storage medium causes UE to execute an information processing method when executable instructions in the storage medium are executed by a processor of the UE. The method includes: a state of an inactive timer is determined; a state of a Sidelink inactive timer is determined; and whether to release an RRC connection is determined according the state of the inactive timer and the state of the Sidelink inactive timer.

As an implementation mode, the executable instructions are configured to execute the following operation.

The Sidelink inactive timer configured for the UE by a base station before determining the state of the Sidelink inactive timer.

As an implementation mode, the executable instructions are configured to execute the following operation.

A Sidelink UE information message is sent to the base station before receiving the Sidelink inactive timer configured for the UE by the base station.

As an implementation mode, the executable instructions are configured to execute the following operation.

The Sidelink inactive timer is started or restarted in response to determining that UE has SDU transceiving on any logical channel related to a Sidelink.

As an implementation mode, the executable instructions are configured to execute that: a Sidelink logical channel indication list configured for UE by a base station is received; and the Sidelink inactive timer is started or restarted in response to determining that the UE has SDU transceiving on a channel corresponding to a Sidelink logical channel indication in the Sidelink logical channel indication list.

As an implementation mode, the executable instructions are configured to execute that: a PQI list configured for UE by a base station is received; and the Sidelink inactive timer is started or restarted in response to determining that the UE has data transceiving corresponding to a PQI in the PQI list.

As an implementation mode, the executable instructions are configured to execute that: the RRC connection is determined to be released responsive to that both the Sidelink inactive timer and the inactive timer expire; or the RRC connection is determined to be released in response to determining that the Sidelink inactive timer expires and the inactive timer is not configured for UE; or the RRC connection is determined to be released in response to determining that the Sidelink inactive timer is not configured for the UE and the inactive timer expires.

As an implementation mode, the executable instructions are configured to execute that: the RRC connection is determined not to be released and an RRC connected state is remained responsive to that one of the inactive timer and the Sidelink inactive timer expires and another one of the inactive timer and the Sidelink inactive timer is still running.

It is to be understood by those skilled in the art that the functions of each program in the storage medium of the present embodiment may be understood with reference to the description of the information processing method applied to the UE side described in the embodiment.

Figure 9:
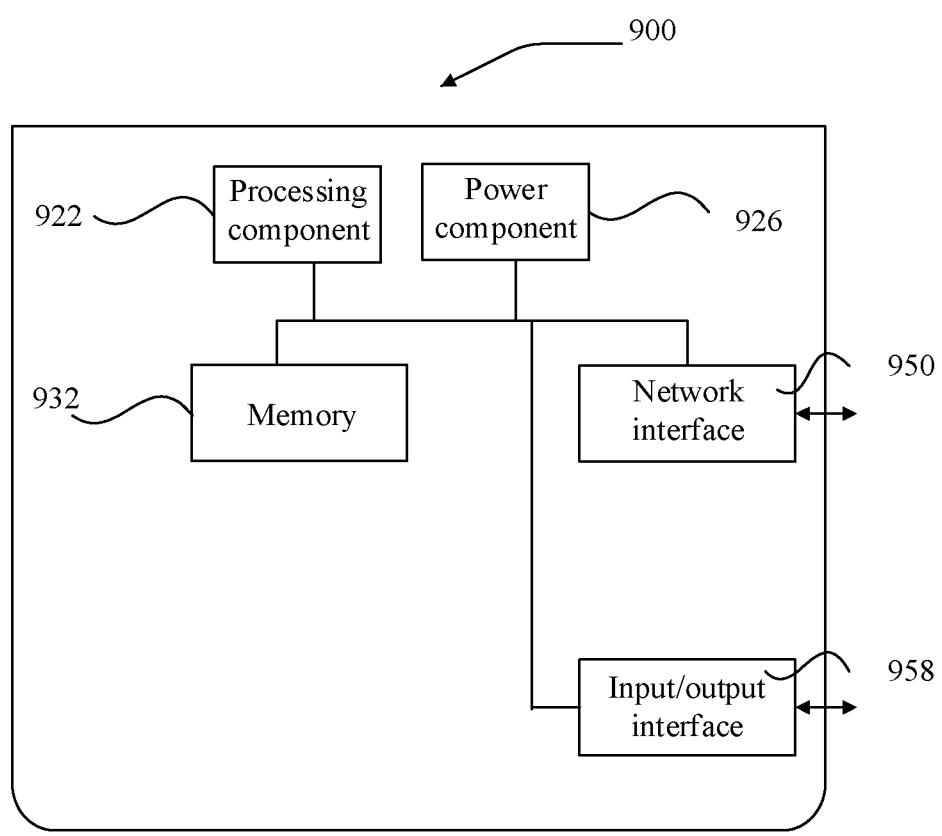
FIG. 9 is a second block diagram of an apparatus for information processing, according to an embodiment.

FIG. 9 is a block diagram of an apparatus 900 for information processing according to an embodiment. For example, the apparatus 900 may be provided as a server. Referring to FIG. 9, the apparatus 900 includes a processing component 922, which further includes one or more processors, and memory resources represented by a memory 932 and configured to store instructions, for example, an application, that may be executed by the processing component 922. The application stored in the memory 932 may include one or more modules each of which corresponds to a set of instructions. In addition, the processing component 922 is configured to execute instructions to perform the above-described information processing method applied to the base station side.

The apparatus 900 further includes a power component 926 configured to execute power management of the apparatus 900, a wired or wireless network interface 950 configured to connect the apparatus 900 to a network, and an I/O interface 958. The apparatus 900 may be operated on the basis of an operating system stored in the memory 932, for example, Windows Server™, Mac OS X™, Unix™, Linux™, FreeBSD™, or the like.

A computer storage medium causes a base station to execute an information processing method when executable instructions in the storage medium are executed by a processor of the base station. The method includes: a Sidelink inactive timer is configured for UE, so that the UE determines whether to release an RRC connection according to a state of an inactive timer and a state of the Sidelink inactive timer.

As an implementation mode, the executable instructions are configured to execute the following operation.

A Sidelink inactive timer is configured for the UE when a preset condition is satisfied.

In the above-mentioned solution, in some embodiments, the preset condition includes the following operations.

A Sidelink UE information message sent by the UE is received.

As an implementation mode, the executable instructions are configured to execute the following operation.

A Sidelink logical channel indication list is configured for the UE, so that the Sidelink inactive timer is started or restarted in response to determining that the UE has SDU transceiving on a channel corresponding to a Sidelink logical channel indication in the Sidelink logical channel indication list.

As an implementation mode, the executable instructions are configured to execute the following operation.

A PQI list is configured for the UE, so that the Sidelink inactive timer is started or restarted in response to determining that the UE has data transceiving corresponding to a PQI in the PQI list.

In the technical solutions recorded in the embodiments of the disclosure may be freely combined without conflicts.

A person skilled in the art can easily figure out other implementation solutions of the disclosure after considering the specification and practicing the disclosure disclosed herein. This application is intended to cover any variations, functions, or adaptive changes of the disclosure. These variations, functions, or adaptive changes comply with general principles of the disclosure, and include common knowledge or a commonly used technical means in the technical field that is not disclosed in the disclosure. The specification and embodiments are to be regarded as illustrative only, and the true scope and spirit of the disclosure are pointed out by the following claims.

It should be understood that the disclosure is not limited to the accurate structures that are described in the foregoing and that are shown in the accompanying drawings, and modifications and changes may be made without departing from the scope of the disclosure. The scope of the disclosure is limited only by the appended claims.

INDUSTRIAL APPLICABILITY

According to the technical solution of embodiments of the disclosure, a Sidelink active timer is configured for UE by a base station, and whether to release an RRC connection according to a state of an inactive timer and a state of the Sidelink inactive timer, so as to ensure that the RRC is in a connected state when the UE has a demand for Sidelink data transceiving, which can avoid continuously repeated processes of RRC release and connection establishment.

What is claimed is:

1. An information processing method, comprising:
    determining a state of an inactive timer;
    determining a state of a Sidelink inactive timer;
    determining whether to release a Radio Resource Control (RRC) connection according to the state of the inactive timer and the state of the Sidelink inactive timer;
    receiving a Prose Quality of Service (QoS) Indication (PQI) list configured for UE by a base station; and
    starting or restarting the Sidelink inactive timer in response to determining that the UE has data transceiving corresponding to a PQI in the PQI list.

2. The information processing method of claim 1, further comprising:
    starting or restarting the Sidelink inactive timer in response to determining that User Equipment (UE) has Service Data Unit (SDU) transceiving on any logical channel related to a Sidelink.

3. The information processing method of claim 1, further comprising:
    receiving a Sidelink logical channel indication list configured for UE by a base station; and
    starting or restarting the Sidelink inactive timer in response to determining that the UE has SDU transceiving on a channel corresponding to a Sidelink logical channel indication in the Sidelink logical channel indication list.

4. The information processing method of claim 1, wherein the determining whether to release the RRC connection according to the state of the inactive timer and the state of the Sidelink inactive timer comprises:
    determining to release the RRC connection responsive to that both the Sidelink inactive timer and the inactive timer expire; or
    determining to release the RRC connection in response to determining that the Sidelink inactive timer expires and the inactive timer is not configured for UE; or
    determining to release the RRC connection in response to determining that the Sidelink inactive timer is not configured for the UE and the inactive timer expires; or
    determining not to release the RRC connection and remaining an RRC connected state responsive to that one of the inactive timer and the Sidelink inactive timer expires and another one of the inactive timer and the Sidelink inactive timer is still running.

5. The method of claim 1, further comprising avoiding repeated establishment and release of the RRC connection due to a request for Sidelink resources based on said determining whether to release the connection according to the state of the inactive timer and the state of the Sidelink inactive timer.

6. An information processing method, comprising:
    configuring a Sidelink inactive timer for User Equipment (UE), so that the UE determines whether to release a Radio Resource Control (RRC) connection according to a state of an inactive timer and a state of the Sidelink inactive timer; and
    configuring a Prose Quality of Service (QoS) Indication (PQI) list for the UE, so that the Sidelink inactive timer is started or restarted in response to determining that the UE has data transceiving corresponding to a PQI in the PQI list.

7. The information processing method of claim 6, further comprising:
    configuring a Sidelink logical channel indication list for the UE, so that the Sidelink inactive timer is started or restarted in response to determining that the UE has Service Data Unit (SDU) transceiving on a channel corresponding to a Sidelink logical channel indication in the Sidelink logical channel indication list.

8. An information processing apparatus, comprising:
    a processor; and
    a memory, configured to store instructions executable by the processor;
    wherein the processor is configured to:
        determine a state of an inactive timer and a state of a Sidelink inactive timer;
        determine whether to release a Radio Resource Control (RRC) connection according to the state of the inactive timer and the state of the Sidelink inactive timer;
        determine whether a Prose Quality of Service (QoS) Indication (PQI) list configured for UE by a base station is received; and
        start or restart the Sidelink inactive timer responsive to determining that the PQI list is received and determining that the UE has data transceiving corresponding to a PQI in the PQI list.

9. The information processing apparatus of claim 8, wherein the processor is further configured to: determine whether User Equipment (UE) has Service Data Unit (SDU) transceiving on any logical channel related to a Sidelink; and
    start or restart the Sidelink inactive timer in response to determining that the UE has the SDU transceiving on any logical channel related to the Sidelink.

10. The information processing apparatus of claim 8, wherein the processor is further configured to:
    determine whether a Sidelink logical channel indication list configured for UE by a base station is received; and
    start or restart the Sidelink inactive timer responsive to determining that the Sidelink logical channel indication list is received and determining that the UE has SDU transceiving on a channel corresponding to a Sidelink logical channel indication in the Sidelink logical channel indication list.

11. The information processing apparatus of claim 8, wherein the processor is further configured to:
    determine to release the RRC connection responsive to that both the Sidelink inactive timer and the inactive timer expire; or
    determine to release the RRC connection in response to determining that the Sidelink inactive timer expires and the inactive timer is not configured for UE; or determine to release the RRC connection in response to determining that the Sidelink inactive timer is not configured for the UE and the inactive timer expires.

12. The information processing apparatus of claim 8, wherein the processor is further configured to:
determine not to release the RRC connection and remain an RRC connected state responsive to that one of the inactive timer and the Sidelink inactive timer expires and another one of the inactive timer and the Sidelink inactive timer is still running.

13. An information processing apparatus, comprising:
a processor, configured to implement operations of the information processing method of claim 6; and
a memory, configured to store instructions executable by the processor.

14. The information processing apparatus of claim 13, wherein the processor is further configured to:
configure a Sidelink logical channel indication list for the UE, so that the Sidelink inactive timer is started or restarted in response to determining that the UE has Service Data Unit (SDU) transceiving on a channel corresponding to a Sidelink logical channel indication in the Sidelink logical channel indication list.

15. A non-transitory computer storage medium, having stored therein instructions that, when executed by a processor, causes the processor to perform the information processing method of claim 1.

16. A non-transitory computer storage medium, having stored therein instructions that, when executed by a processor, causes the processor to perform the information processing method of claim 6.

* * * * *